ns

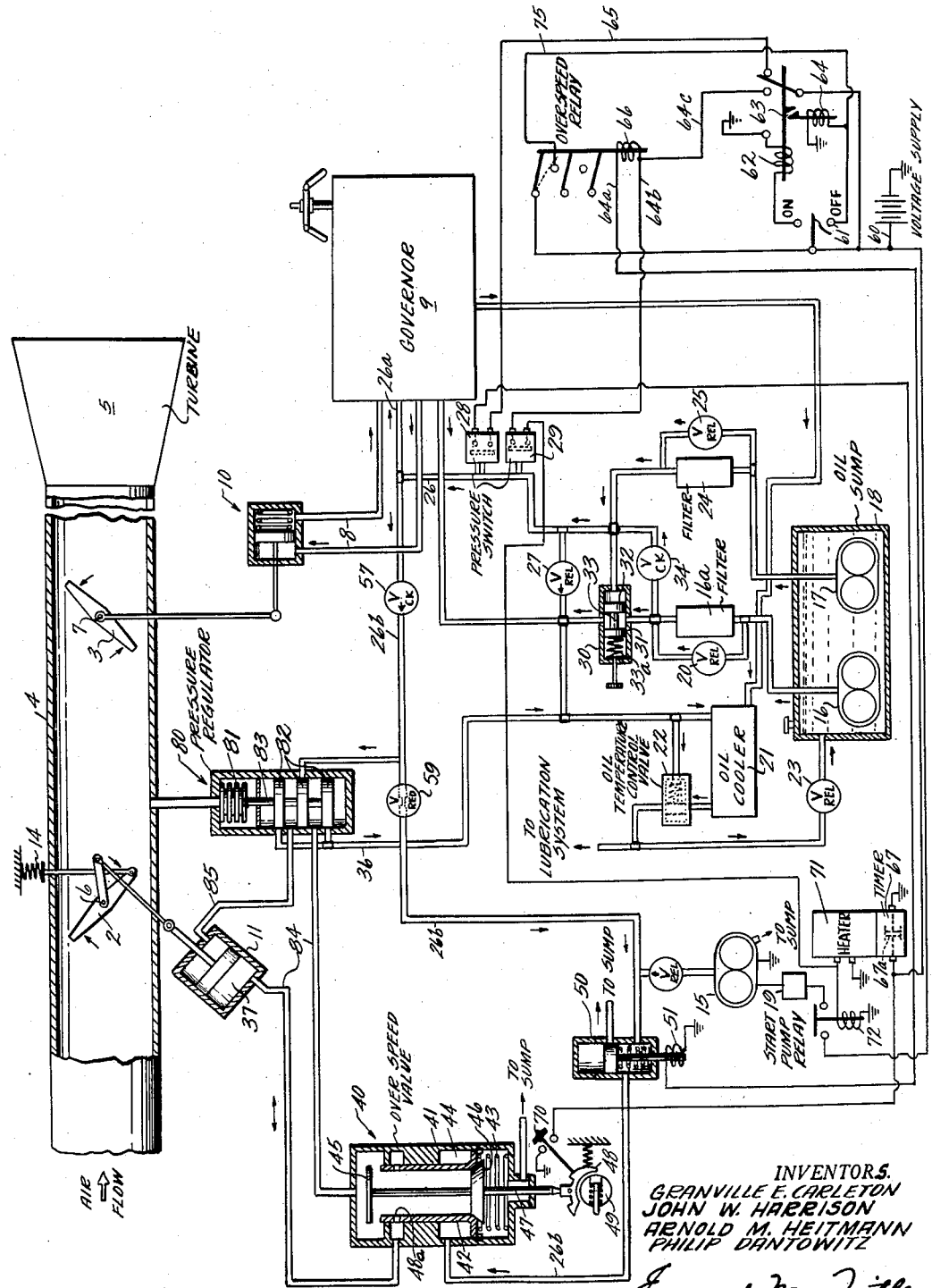

United States Patent Office 2,894,521
Patented July 14, 1959

2,894,521

CONTROL SYSTEM FOR TURBINE DRIVES

Granville E. Carleton, Beverly Farms, John W. Harrison, Danvers, Arnold M. Heitman, Swampscott, and Philip Dantowitz, Mattapan, Mass., assignors to General Electric Company, a corporation of New York Application May 31, 1955, Serial No. 512,024

7 Claims. (Cl. 137—17)

The present invention relates to a control system for a prime mover and in particular to a system for controlling the flow of motive fluid to an airborne turbine drive for accessories.

It is common present day practice to drive accessories on an aircraft by relatively small high-speed turbine units which use as motive fluid pressurized air bled from the compressor section of a main propulsion engine of the turboprop or turbojet type. Pressurized air bled from the propulsion engine is conducted through fluid conduits to the turbine units which may be remotely located in the aircraft where they are used to drive alternators, hydraulic pumps, and other types of accessories. In this type of system it is common to provide one or more valves at some point in the conduit between the source of motive fluid and the inlet for controlling the flow of motive fluid to the turbine. The purpose of these valves is to control starting and stopping of the turbine unit as well as its speed during operation. In many applications, two valves are used, one of which controls starting and stopping of the system only, whereas a second valve in series with the first controls the quantity of flow and hence the power output of the turbine when the first is opened. In this type of arrangement it is ordinarily desirable to have a control system which for the sake of reliability operates independently of an external power source after the unit has started. Accordingly, it is an object of the present invention to provide an improved control system which requires no external power for its operation after starting.

Since accessory turbines of the type described have relatively low inertias and operate at high speeds it is important that provision be made for quickly interrupting the flow of motive fluid to the turbine in the event of a loss in load or any other condition which may tend to cause overspeeding. Another object of the invention is therefore to provide control means which quickly interrupt the flow of motive fluid to a turbine upon overspeeding of the turbine.

Still another object of the invention is to provide a control system for an accessory turbine drive for aircraft which is light-weight, reliable, and requires a minimum of pilot supervision.

Briefly these and other objects are accomplished by providing an improved control system which is principally hydraulic which requires external electrical power only during starting and also means for rapid shutdown of the unit by venting to a drain the fluid conduits in the control containing pressurized fluid.

The invention will be better understood from the following description taken in connection with the accompanying drawing which is a diagrammatic representation of a preferred embodiment of the invention. Referring to the drawing, two valve disks 2 and 3 are disposed in a fluid conduit 4 through which pressurized motive fluid is supplied to a turbine 5. The valve disks 2 and 3 are mounted on shafts 6 and 7 respectively which are rotatably mounted in journals or bearings (not shown) in the walls of the conduit 4. The valve disk 2 serves to start and stop the unit being in the fully closed position when the unit is stopped.

The valve disk 3 controls the amount of flow of motive fluid to the turbine when the valve 2 is open to regulate the speed of the turbine. The speed governor 9 which may be of any conventional type is driven by the turbine and senses its speed and supplies pressurized fluid through the conduits 8 to a piston actuator 10 which controls the opening of the valve disk 3.

In addition to serving to provide the stop-start function to the system, the valve disk 2 also serves to regulate the fluid pressure in the conduit between it and the valve disk 3 in order to simplify the speed control problem. By minimizing the pressure variations upstream from the valve disk 3 the ratio of incremental turbine power output to valve opening or "gain" is maintained more nearly constant so that the sensitivity requirements of the governor are less stringent.

It will be understood by those skilled in the art, however, that the pressure regulation feature is not essential to all speed control systems of this type and also that the start-stop functions performed by valve disk 2 and speed regulation of functions performed by valve disk 3 may be combined and performed by a single valve disk if particularly desirable in certain instances without departing from the scope of the invention.

The positioning of valve disk 2 is accomplished by a fluid piston actuator 11 which operates to open the valve 2 against the biasing force of a spring 14 which biases the valve towards the closed position. Pressurized fluid is supplied to the system by three positive displacement pumps of any well-known type 15, 16, and 17. A lube pump 16 and a control pump 17 are driven mechanically from the turbine 5 and pick up oil from a sump 18 to deliver it to pressure portions of the system. The start pump 15 is driven by a small electric motor 19 and supplies pressurized fluid to start the system and runs until the turbine has reached sufficient speed for pump 16 and pump 17 to supply adequate pressure to render the speed control system including the governor 9 operative.

Lubricating oil is supplied to the lubrication system for the unit by the pump 16 which picks oil up from the sump 18 and passes it through a filter 16a which is shunted by a pressure relief valve 20 which operates to bypass the filter if the pressure drop across it should become too great and then passes the oil through an oil cooler 21 which is provided with a temperature control valve 22 which serves to bypass the cooler when the oil temperature is below a given value. A pressure relief valve 23 is set to maintain the desired pressure in the lubrication system supply (usually about 20 p.s.i.), the excess oil bypassing the lubrication system and returning to the oil sump 18 through the relief valve 23. The control oil pump 17 picks oil up from the oil sump 18 and delivers it through a filter 24 which is shunted by a pressure relief valve 25 and to the governor 9 through a fluid conduit 26. The pressure of the fluid in the conduit 26 is maintained at a relatively high value which may be in the order of 200–300 p.s.i. by pressure relief valve 27 which bypasses fluid in excess of that required by the governor 9 to the lubrication supply system including the oil cooler 21 and temperature control valve 22. The fluid pressure in the fluid conduit 26 is sensed by two pressure switches 28 and 29 and an unloading valve 30. The pressure actuated electrical switches 28 and 29 are of a common type, the pressure switch 28 having normally open contacts which are closed when the pressure in the conduit 26 exceeds a predetermined value and the pressure switch 29 having normally closed electrical contacts which open in response to a predetermined pressure in conduit 26 which exceeds a given value. The unloading valve 30 comprises two disks 31 and 32 interconnected by a stem 33 and biased to the right by a spring 33a. As long as the pressure in the conduit 26 is above a predetermined value, the disks 31 and 32 are held in the position shown in the drawing as a result of the force created by the fluid pressure acting on the disk 32 acting against the biasing force of the spring 33a. When the pressure in the conduit 26 falls below a predetermined value, the disk and stem assembly are forced to the right by the biasing force of the spring 33a so that the disk 31 interrupts fluid communication therethrough. A check valve 34 is provided to permit flow from the lube pump 16 into the fluid conduit 26 when the unloading valve 30 is actuated to permit fluid flow therethrough and to prevent fluid flow therethrough in the reverse direction. High pressure oil is fed to the governor 9 from conduit 26 through a branch conduit 26a, the remainder of the high pressure oil flowing through branch conduit 26b including a one-way check valve 57 similar to the check valve 34, the valve 57 being arranged so as to permit flow from the control pump 17 to a pressure regulator 80 and prevent flow in the reverse direction. An orifice 59 is provided in the conduit 26b at a point downstream from the pressure regulator 80 to present a pressure drop in the conduit 26b to insure the proper sequence of fluid supplied to the overspeed valve 40 as will be described below.

The pressure regulator valve 80 comprises a bellows 81 arranged to sense the fluid pressure in the motive fluid supply conduit 4 at a point between the valve disks 2 and 3. The bellows 81 operates to control the position of three valve disks 82 within the valve 80 which are interconnected by a common stem 83. The valve disks 82 are arranged with respect to ports in the valve casing so that when the pressure sensed by the bellows 81 is below the desired pressure level the valve disk and stem assembly will move upward from the position shown in the drawing so that fluid communication is established between the high pressure oil supply line 26b and fluid conduit 84 which communicates with the piston actuator 11 through an overspeed valve 40. When in this position the valve also provides fluid communication between the conduit 85 which communicates with the opposite end of the piston actuator 11 and conduit 36 which returns oil to the sump 18. Thus the over-all effect of a pressure lower than a predetermined maximum results in pressurized fluid passing through the conduit 84 and overspeed valve 40 to the piston actuator 11 causing the piston to move in a generally upward position to open the valve 2. Conversely when the pressure sensed is greater than the predetermined maximum, the bellows 81 causes the valve disk assembly including the disk 82 and stem 83 to move in a downward direction so that fluid communication is established between the high pressure supply line 26b and the conduit 85 which leads to one end of the piston actuator 11, the opposite end being vented to the conduits 84 and 36 to the sump 18.

The overspeed valve 40 is provided to bleed fluid from the chamber 37 of the piston actuator 11 in the event of an overspeed or other stop signal so that the spring 14 will snap the valve disk 2 shut quickly to shut down the unit. The overspeed valve 40 comprises a casing 41 in which is mounted a slidable sleeve 42 which is biased upwardly by a spring 43, an annular fluid-tight chamber 44 being formed between the sleeve 42 and casing 41 which is in fluid communication with the conduit 26b. A double poppet arrangement is mounted within the valve having a poppet disk 45 arranged to seat the upper periphery of a sleeve 42 and a second poppet disk 46 connected to the first by a stem 47 and arranged to seat the lower periphery of the sleeve 42. A fluid conduit 84 communicates with the upper end of the valve casing 41, and the lower part of the valve casing 41 communicates either directly or through a conduit with the oil sump 18. Continuous fluid communication is provided between the central portion of the sleeve 42 and the conduit 84 through openings 48a in the sleeve member 42. The stem member 47 of the valve extends through the casing 41 and rides on an overspeed trip mechanism 48 which is tripped by an eccentric mass type of overspeed sensor 49 which rotates with the shaft of the turbine 5 or some other rotating member driven therefrom.

A solenoid operated three-way pilot valve 50 including an electrical solenoid 51 in the fluid conduit 26b operates to establish a fluid communication between the conduit 26b and the sump 18 and break communication between conduit 26b and chamber 44, when an electrical voltage is applied to the solenoid 51. In the de-energized condition the valve 50 operates to establish fluid communication between the chamber 44 and the conduit 26b and break fluid communication between the sump 18 and the conduit 26b. Electrical energy is supplied to the system through a voltage bus 60. An on-off switch 61 of the single pole double throw type is used to control the application of electrical energy from the voltage bus 60. When in the "on" position, the switch 61 applies electrical energy to the pickup coil of a relay 62 which is provided with latch means 63 to hold the relay closed after it is initially energized. In the latched position, the relay 62 applies electrical energy from the voltage bus 60 to electrical conductor 64c. When the on-off switch 61 is put in the "off" position, the latch release coil 64 is energized releasing the latch means 63 so that the relay 62 will return to the unlatched position as shown in the drawing. In this position electrical voltage is applied from the voltage bus 60 to an electrical conductor 65. The electrical conductor 65 is connected electrically in series with the normally opened contacts of the pressure switch 28 which when closed applies electrical voltage to the solenoid 51 of the soleniod operated relief valve 50. The electrical conductor 64c supplies energy to the coil of an overspeed relay 66 which is in series with a parallel circuit including the normally open contacts 67a of an electrical timer 67 and an electrical overspeed switch 70 which is normally open contacts which are closed by the trip mechanism 48 in response to an overspeed condition of the turbine. A conductor 64b supplies energy from the conductor 64c through the contacts of the normally closed pressure switch 29 to an electrical heater 71 and a start pump relay 72. The timer 67 is of the thermal type and includes an electrical heater 71 which provides heat to cause bimetalic contacts 67a to close after the heater has been energized for a predetermined period of time. The start pump relay 72 has normally open contacts which when closed complete electrical continuity between the voltage bus 60 and the electric motor 19 which drives the start pump 15.

The operation of the apparatus thus described is as follows.

*Starting and normal running*

When the unit is in the shutdown condition, the operator momentarily turns the on-off switch 61 to the "on" position thus energizing the coil 62 and establishing electrical continuity between the voltage bus 60 and electrical conduit 64c. Electrical energy is then supplied through the branch conductor 64b and normally closed pressure switch 29 to the heater 71 of the timer 67 and the start pump relay 72 causing the start pump to start running. Electrical voltage is also applied through the conductor 64a to the normally open overspeed switch 70 and timer switch 67 which will be open during normal start so that the overspeed relay is de-energized and electrical continuity is not established through its contacts between the voltage bus 60 and the conductor 75 unless either the switch 70 or the switch 67 is closed. High pressure oil supplied by the start pump 15 flows into the high pressure supply conduit 26b passing through the de-energized solenoid pilot valve 50 to the pressure chamber 44 of the overspeed valve 40 causing the sleeve 42 to move downward against the biasing force of the spring 43 to assume the position shown in the drawing. The orifice 59 restricts flow from the pump 15 to the pressure regulator valve 80 until the sleeve 42 is seated on the valve seat 46. After the sleeve 42 is seated, the entire output of the pump 15 passes through the orifice 59 to the pressure regulator valve 80. Since the valve disk 2 is in its closed position at this point, the pressure sensed by the bellows 81 of the pressure regulator valve 80 will be relatively low so that the valve disk assembly comprising the stem 83 and disks 82 will be in its upper position so that fluid communication is established between the high pressure supply lines 26b and the chamber 37 of the piston actuator 11 through conduit 84 and the overspeed valve 40. When in this position the pressure regulator valve 80 provides fluid communication between the chamber 37 of the piston actuator 11 and the high pressure supply line 26b so that the net unbalance in fluid pressures on the piston of the actuator 11 will cause a force to oppose the biasing force of the spring 14 to open the valve disk 2 in the conduit 4. As the valve 2 opens motive fluid will flow through the conduit 4 to the turbine 5 causing it to begin to rotate. As the turbine 5 begins to rotate, the lube and control pumps 16 and 17 respectively will also begin to rotate providing pressurized oil to the system. The increasing speed of the turbine causes the quantity of oil supplied by the control pump 17 to increase correspondingly building up the pressure in the fluid conduit 26 leading to the governor 9. As long as the pressure in the conduit 26 is below a predetermined value in the vicinity of 150 p.s.i. the disk and stem assembly 30 will be urged by the spring 33a therein so that the oil delivered by the lube pump 16 will be forced to flow through the check valve 34 and the conduit 26 to supplement the output of the control oil pump 17. When the pressure in the conduit 26 exceeds this value, the disk and stem assembly of the valve 30 assume the position shown in the drawing so that lube oil then flows to the lubrication system from the pump 16 through the cooler 21. The pressure switches 28 and 29 are set so that when pressure in the conduit 26 exceeds a predetermined value also in the neighborhood of 150 p.s.i., the electrical contacts of the switch 28 close and those of the switch 29 open. When the control oil pressure reaches approximately 150 p.s.i. the governor 9 begins to operate through the piston actuator 10 to position the speed control valve disk 3 to control the flow of motive fluid to the turbine thus regulating the speed of the unit. Opening the normally closed contacts of the pressure switch 29 de-energizes the start pump relay so that the electrically driven start pump 15 is shut down and also de-energizes the heater 71 of the thermal time switch 67. Closure of the normally open contacts of the pressure switch 28 completes electrical continuity from electrical conductor 65 to the solenoid 51 to prepare the stop circuit for unit shutdown. Thus the unit continues to accelerate up to its operating speed which is maintained at a nearly constant value by the speed governor 9. If for some reason the unit should fail to accelerate to a high enough speed to provide adequate pressure in the conduit 26 to open the normally closed contacts of the pressure switch 29 within a predetermined period of time, the normally open contacts 67a of the timer 67 will close thus completing a circuit from the voltage bus 60 to ground through the overspeed relay coil 66 which operates to shut down the unit in the same manner as described below in connection with overspeed shutdown. During normal operation the valve disk 2 is maintained in its open position by fluid supplied through the pressure regulator valve 80 and overspeed valve 40 passing from the conduit 26b to the pressure chamber 37 of the piston actuator 11. Should the pressure upstream between the valve disk 2 and disk 3 exceed a predetermined maximum, the pressure regulator valve 80 will vary the net pressure across the piston of the actuator 11 causing the valve disk to assume a new position which results in the desired pressure between the valves 2 and 3. The desired turbine speed is maintained by the speed governor 9 which senses turbine speed and positions the valve disk 3 to maintain the desired speed. Normally a sufficient quantity of control oil will be supplied by the control oil pump 17 to fulfill the needs of the governor 9. However, under certain transient conditions or in the event of a malfunction of the control pump, the reduced pressure in conduit 26 will cause the unloading valve 30 to operate to cause oil to flow through the check valve 34 to supplement the supply from the control pump and maintain the desired control oil pressure in the conduit 26. In this manner the total pumping capacity of pumps 16 and 17 is available for supplying oil to the governor 9 and pressure regulator 90.

*Normal shutdown*

When the unit is running normally as described above and the operator wishes to shut the unit down he momentarily turns the on-off switch 61 to the "off" position thus energizing the latch release coil 64 so that the relay 62 assumes the position shown in the drawing. With the relay 62 in this position, electrical continuity is established between the voltage bus 60 and electrical conductor 65 and since the contacts of the pressure switch 28 are closed electrical continuity is also completed through the solenoid 51 of the solenoid operated relief valve 50. The valve 50 vents the conduit 26b to the sump 18 thus dropping the pressure in the pressure chamber 44 of the overspeed valve 40 so that the spring 43 will move the sleeve 42 upward breaking the seal between the poppet disk 46 and the sleeve 42 venting the chamber 37 of the piston actuator 11 to the oil sump 18. The same upward movement of the sleeve 42 forms a sealing engagement between the upper poppet 45 and sleeve 42 thus closing off the flow of high pressure oil from the pressure regulator valve 80. Venting the oil from the pressure chamber 37 of the piston actuator 11 to the drain to the oil sump 18 through the overspeed valve 40 allows the spring 14 to quickly close the valve disk 2 thus shutting down the unit. As the turbine decelerates, the lube and control oil pump 16 and 17 supply less flow so that the oil pressure in the conduit 26 drops off. When the pressure in the conduit 26 decreases to 25 p.s.i., the normally open contacts of the pressure switch 28 open to remove power from the solenoid 51 of the solenoid operated three-way pilot valve 50. Thus the system is ready for restarting.

*Overspeed shutdown*

The mechanical overspeed trip 49 provides emergency shutdown by mechanically tripping the overspeed trip lever 48. When tripped, the overspeed trip lever 48 allows the stem 47 to move downwardly in the valve 40 thus unseating the lower poppet disk 46 and seating the upper poppet disk 45 to shut off the supply of high pressure fluid to the piston actuator 11 and vent it to the oil sump 18. Thus the piston actuator when vented allows the spring 14 to close the valve disk 2 shutting off the flow of motive fluid to the turbine 5. The overspeed trip lever 48 also causes the overspeed switch 70 to close completing a circuit through the coil of the overspeed relay 66 causing its contact to close thus applying voltage from the voltage bus 60 through conductor 75 to the latch release coil 64 causing the relay 62 to move to the stop position so that the same sequence of operation could accompany normal shutdown then follow. After the unit comes to a stop, it may be restarted in the normal way by momentarily moving the on-off switch 61 to the "on" position.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What we claim as new and desire to secure by Letters Patent of the United States is:

1. In combination with a turbomachine having a fluid lubrication system, a first valve for controlling the flow of motive fluid to said turbomachine, fluid motor means including a speed governor driven by said turbomachine for controlling the opening of said valve to control the speed of said turbomachine, first and second pumping means driven by said turbomachine and having fluid intakes connected to a common supply, first fluid conduit means connecting the output of said first pumping means and said lubrication system, second fluid conduit means connecting the output of said second pumping means and said fluid motor means, third fluid conduit means connecting said first and second fluid conduit means, said third conduit means including valve means for permitting fluid flow therethrough from said first conduit means to said second conduit means and preventing flow therethrough in the reverse direction, fluid pressure actuated valve means having a passage in series flow relation with said first conduit means at a point between said fluid motor means and the junction between said first and third fluid conduit means and a pressure chamber connected by fourth fluid conduit means to said second fluid conduit means to sense the fluid pressure therein and control means responsive to the pressure in said chamber to obstruct said passage when the pressure in said first conduit is below a predetermined value.

2. A pumping arrangement comprising first and second pumping means supplying fluid under pressure to first and second fluids loads, first fluid conduit means connecting said first pumping means and said first fluid load, second fluid conduit means connecting said second pumping means and said second fluid load, third fluid conduit means connecting said first and second fluid conduit means, said third conduit means including valve means for permitting fluid flow therethrough from said first conduit means to said second conduit means and preventing flow therethrough in the reverse direction, fluid pressure actuated valve means having a passage in series flow relation with said first conduit means at a point between said first fluid load and the junction between said first and third fluid conduit means, and a pressure chamber connected by fourth fluid conduit means to said second fluid conduit means to sense the fluid pressure therein and control means responsive to the pressure in said chamber to obstruct said passage when the pressure in said second conduit is below a predetermined value.

3. A fluid pumping arrangement comprising first and second pumps, a supply of fluid for each of said pumps, first and second fluid conduits connected to direct pressurized fluid from said first and second pumps to first and second fluid loads respectively, a third conduit providing fluid communication between said first and second conduits, said third conduit comprising means to permit flow therethrough from said first to said second conduit but preventing flow therethrough in the opposite direction, valve means in said first conduit between said first load and the junction of said first and third conduits, and means to close said valve means in response to a fluid pressure in said second conduit below a predetermined value.

4. In combination with a turbomachine having a fluid lubrication system, speed control means including a speed governor driven by said turbomachine, flow controlling means for controlling the flow of motive fluid to said turbomachine, fluid motor means connected to position said flow control means and controlled by said speed governor, first and second fluid pumps, a supply of fluid for each of said pumps, first fluid conduit means connected between the output of said first pump and said fluid lubrication system, second fluid conduit means connected between said second pump and said fluid motor means, third fluid conduit means connecting said first and second conduit means, and valve means for blocking flow to said lubrication system and directing flow from said first pump through said first and third conduits to said second conduit, when the fluid pressure in said second conduit falls below a predetermined value.

5. In combination with a turbomachine including a lubrication system, pressure control means including a governor and fluid motor controlled valve means for regulating the speed of said turbomachine, first and second fluid pumping systems driven by said turbomachine, a third fluid pumping system driven by independent motor means, said first pumping system supplying fluid to said lubrication system, said second pumping system supplying fluid to said pressure control means, interconnecting conduit means including valve means interconnecting said first and second pumping systems and permitting flow from said first pumping system to said second pumping system but preventing flow in the reverse direction, means responsive to the pressure differential between said first and second pumping systems for blocking the flow in said first pumping system at a point downstream of said interconnecting conduit means when the pressure in said second system falls below a preselected level, whereby the pressure in said first system is caused to increase to permit fluid flow from said first pumping system to said second pumping system through said interconnecting conduit means, means connecting said third pumping system to said pressure control means, and pressure sensitive means to de-energize said motor means when the fluid pressure in said second pumping system exceeds a preselected magnitude.

6. Apparatus in accordance with claim 5 including valve means connected in fluid communication with said second pumping system to vent said second pumping system and reduce the pressure therein in response to a stop signal, thereby allowing said fluid motor controlled valve means to close.

7. Apparatus in accordance with claim 5 including timing means to de-energize said independent motor means after a preselected period of operation.

References Cited in the file of this patent

UNITED STATES PATENTS

| | | |
|---|---|---|
| 1,629,318 | Standerwick | May 17, 1927 |
| 1,694,975 | Goodwin | Dec. 11, 1928 |
| 1,729,458 | Schwendner | Sept. 24, 1929 |
| 2,110,662 | Fisher | Mar. 8, 1938 |
| 2,285,208 | Johntz et al. | June 2, 1942 |
| 2,440,844 | Bryant | May 4, 1948 |
| 2,674,854 | Church | Apr. 13, 1954 |